United States Patent
Kato et al.

(10) Patent No.: US 9,964,144 B2
(45) Date of Patent: May 8, 2018

(54) MANUFACTURING METHOD FOR FLUID DYNAMIC BEARING DEVICES

(71) Applicant: NTN CORPORATION, Osaka (JP)

(72) Inventors: Daichi Kato, Mie (JP); Toshiaki Niwa, Mie (JP)

(73) Assignee: NTN CORPORATION, Osaka (JP)

(*) Notice: Subject to any disclaimer, the term of this patent is extended or adjusted under 35 U.S.C. 154(b) by 0 days. days.

(21) Appl. No.: 15/520,944

(22) PCT Filed: Oct. 20, 2015

(86) PCT No.: PCT/JP2015/079564
§ 371 (c)(1),
(2) Date: Apr. 21, 2017

(87) PCT Pub. No.: WO2016/080137
PCT Pub. Date: May 26, 2016

(65) Prior Publication Data
US 2017/0343042 A1    Nov. 30, 2017

(30) Foreign Application Priority Data

Nov. 20, 2014   (JP) .................................. 2014-235543

(51) Int. Cl.
*F16C 32/06* (2006.01)
*F16C 17/02* (2006.01)
(Continued)

(52) U.S. Cl.
CPC .......... *F16C 17/026* (2013.01); *F16C 17/045* (2013.01); *F16C 33/08* (2013.01);
(Continued)

(58) Field of Classification Search
CPC .... F16C 17/026; F16C 17/045; F16C 17/107; F16C 33/08; F16C 43/02
See application file for complete search history.

(56) References Cited

U.S. PATENT DOCUMENTS

| 8,782,901 B2* | 7/2014 | Mizutani | F16C 33/107 |
| | | | 29/898.02 |
| 2003/0169952 A1* | 9/2003 | Yamashita | F16C 17/107 |
| | | | 384/107 |

(Continued)

FOREIGN PATENT DOCUMENTS

| JP | 2002-61637 | 2/2002 |
| JP | 2003-239974 | 8/2003 |

(Continued)

OTHER PUBLICATIONS

International Search Report dated Jan. 19, 2016 in International (PCT) Application No. PCT/JP2015/079564.

*Primary Examiner* — Phillip A Johnson
(74) *Attorney, Agent, or Firm* — Wenderoth, Lind & Ponack, L.L.P.

(57) ABSTRACT

The present invention relates to a manufacturing method for a fluid dynamic bearing device, the method involving: forming an axial clearance 14 having a clearance width δ equal to a total amount of clearance widths of two thrust bearing clearances δ1, δ2 between a second bearing surface C of a bearing member 22 fixed to an outer periphery of a shaft member 21 and a sealing member 9; relatively moving the shaft member 21, the shaft member 22, and the sealing member 9 with respect to a housing 7 while the clearance width δ of the axial clearance 14 is maintained after forming the axial clearance 14; and fixing the sealing member 9 to the housing 7 at a time when a first thrust bearing surface B of the bearing member 22 comes into contact with a bottom surface 7*b* of the housing 7.

4 Claims, 4 Drawing Sheets

(51) Int. Cl.
 F16C 17/04 (2006.01)
 F16C 33/08 (2006.01)
 F16C 43/02 (2006.01)
 H02K 5/16 (2006.01)
 H02K 7/08 (2006.01)
(52) U.S. Cl.
 CPC ............... *F16C 43/02* (2013.01); *H02K 5/16* (2013.01); *H02K 7/08* (2013.01)

(56) References Cited

U.S. PATENT DOCUMENTS

2010/0132197 A1* 6/2010 Hori .................. F16C 17/026
 29/898.02
2012/0315169 A1* 12/2012 Hori .................. F16C 17/107
 417/423.12
2015/0147010 A1* 5/2015 Komatsubara .......... F16C 33/74
 384/107

FOREIGN PATENT DOCUMENTS

| JP | 2003-314538 | 11/2003 |
| JP | 2006-342975 | 12/2006 |
| JP | 2007-024089 | 2/2007 |

\* cited by examiner

MANUFACTURING METHOD FOR FLUID DYNAMIC BEARING DEVICES

TECHNICAL FIELD

The present invention relates to a manufacturing method for a fluid dynamic bearing device.

BACKGROUND ART

As is well known, a fluid dynamic bearing device has features in, for example, its high speed rotation, high rotational accuracy, and quietness. Thus, the fluid dynamic bearing device is suitably used as a bearing device for a motor, such as for a spindle motor to be built in a disk drive such as an HDD, for a fan motor to be built in a PC and other devices, or for a polygon scanner motor to be built in a laser beam printer (LBP).

The fluid dynamic bearing device includes a radial bearing portion and thrust bearing portions, which are configured to support a rotating side in a radial direction and thrust directions, respectively. Recently, both the bearing portions are frequently made up of fluid dynamic bearings. The thrust bearing portions, each being made up of the fluid dynamic bearings (thrust bearing clearances thereof) are provided on both axial sides of a flange portion provided to one end of a shaft member (for example, FIG. 2 of Patent Literature 1) in some cases, and are provided on both axial sides of a bearing member fixed to an outer periphery of the shaft member (for example, FIG. 2 of Patent Literature 2) in some cases, and the like. In a fluid dynamic bearing device disclosed in Patent Literature 2, the flange portion provided to the one end of the shaft member in a fluid dynamic bearing device disclosed in Patent Literature 1 is omitted. Therefore, a configuration disclosed in Patent Literature 2 has an advantage in that the entire device can be compactified in an axial direction by an amount corresponding to the omission of the flange portion.

Incidentally, when the rotating side is supported by the thrust bearing portions each being made up of the fluid dynamic bearings, clearance widths of the thrust bearing clearances are required to be set and managed with high accuracy. Therefore, at time of assembly of the fluid dynamic bearing device (at time of assembly of members), the members are assembled while relative axial positions of the members involved in formation of the thrust bearing clearances is strictly managed. In the fluid dynamic bearing device disclosed in FIG. 2 of Patent Literature 2, a sealing member is fixed to a housing under a state of being axially engaged with a step portion formed on the housing. In this case, when the step portion is formed at a position that enables the two thrust bearing clearances to be set to predetermined clearance widths, it is considered that the clearance widths of the two thrust bearing clearances can be set easily with high accuracy only by fixing the sealing member to the housing under a state in which the sealing member is engaged with the step portion.

CITATION LIST

Patent Literature 1: JP 2003-239974 A
Patent Literature 2: JP 2007-24089 A

SUMMARY OF INVENTION

Technical Problem

However, the housing, the sealing member, the bearing member, and the like have a dimensional tolerance, and hence there is a variation in size and shape between individuals. Thus, even when the sealing member is fixed to the housing under a state of being engaged with the step portion, the clearance widths of the thrust bearing clearances cannot always be set to predetermined values. Therefore, in practice, the sealing member is required to be fixed to the housing while the relative axial positions of the sealing member and the housing are strictly managed.

In Patent Literature 1, there is disclosed a method of assembling the fluid dynamic bearing device including the housing having a cylindrical shape with a closed end as a component (clearance setting method for the thrust bearing clearances). When this method is applied to the assembly of the fluid dynamic bearing device disclosed in Patent Literature 2, one end surface and another end surface of the bearing member fixed to the outer periphery of the shaft member are each required to be reliably brought into abutment against an end surface of the housing and an end surface of the sealing member, which are opposed to each other. However, the housing has the cylindrical shape with the closed end, and hence an abutment state between the opposed surfaces cannot be precisely obtained. Thus, the sealing member is required to be pressed toward a bottom portion of the housing with a relatively large pressurizing force. Therefore, there is a fear in that accuracy of one or a plurality of the end surfaces may be adversely affected to lower bearing performance in the thrust directions. Further, in particular, when the sealing member is fixed to the housing in an interference fit state, the relative axial positions of the shaft member and the bearing member are varied along with relative movement of the shaft member and the bearing member fixed to the outer periphery thereof, and the sealing member in the axial direction with respect to the housing after the reference setting described above. As a result, there is a possibility of generation of problems in that the clearance widths of the thrust bearing clearances cannot be set with high accuracy, that abrasion power is generated at a contact portion between the sealing member and the housing, and the like.

In view of the circumstances described above, an object of the present invention is to set clearance widths of two thrust bearing clearances easily with high accuracy for assembly of a fluid dynamic bearing device in which the thrust bearing clearances of a thrust bearing portion are formed on one end surface and another end surface of a bearing member fixed to an outer periphery of a shaft member.

Solution to Problem

According to one embodiment of the present invention, which has been devised to achieve the above-mentioned object, there is provided a manufacturing method for a fluid dynamic bearing device, the fluid dynamic bearing device comprising a shaft member, a bearing member fixed to an outer periphery of the shaft member, a housing integrally having a cylinder portion and a bottom portion configured to close an opening at one end of the cylinder portion, the housing configured to accommodate the shaft member and the bearing member so as to enable relative rotation thereof, a sealing member configured to seal an opening at another end of the housing, the bearing member comprising a radial bearing surface configured to form a radial bearing clearance on an outer peripheral surface of the bearing member in cooperation with an inner peripheral surface of the cylinder portion, a first thrust bearing surface, which is formed on one end surface, and is configured to form a first thrust bearing clearance in cooperation with the bottom portion, and a second thrust bearing surface, which is formed on another end surface, and is configured to form a second thrust bearing clearance in cooperation with the sealing member, for assembly of the fluid dynamic bearing device, the method comprising: forming an axial clearance having a clearance width equal to a total amount of clearance widths of the two thrust bearing clearances between the second thrust bearing surface of the bearing member fixed to the outer periphery of the shaft member and the sealing member; relatively moving the shaft member, the bearing member, and the sealing member in an axial direction with respect to the housing while the clearance width of the axial clearance is maintained after forming the axial clearance; and fixing the sealing member to the housing at a time when the first thrust bearing surface of the bearing member comes into contact with the bottom portion. Herein, "thrust bearing surface" is a surface that forms the thrust bearing clearance in cooperation with an opposed end surface regardless of formation of a dynamic pressure generating portion.

According to the method described above, the widths of the first thrust bearing clearance and the second thrust bearing clearance are set substantially outside of the housing. Therefore, members involved in the formation of the thrust bearing clearances are not required to be brought into firm abutment against each other in a reference setting stage that is to be first carried out in an assembly step. Further, in a clearance width setting stage for the thrust bearing clearances (axial clearance forming stage), which is carried out after the reference setting, the shaft member and the housing are not required to be moved relatively in the axial direction under a state in which the bearing member is engaged with the sealing member. Therefore, even when the sealing member is fixed to the housing under an interference fit state, there may be eliminated a risk that relative axial positions of the shaft member and the bearing member may be varied. Therefore, the clearance widths of the thrust bearing clearances, each being formed on the one end surface and the another end surface of the bearing member fixed to the outer periphery of the shaft member, can be set easily with high accuracy.

In terms of a configuration of the present invention, for setting the clearance widths of the (two) thrust bearing clearances, a force in the axial direction is not exerted on the bearing member fixed to the outer periphery of the shaft member. Therefore, a method of fixing the bearing member to the shaft member only needs to ensure fastening strength that can restrict the relative movement between the shaft member and the bearing member during delivery or an operation of the fluid dynamic pressure bearing device. Such fastening strength can be ensured by fixing the bearing member to the outer periphery of the shaft member only by press-fit. When the bearing member is fixed to the shaft member only by the press-fit, the assembly of the fluid dynamic pressure bearing device can be easily and quickly performed. Thus, manufacturing cost of the fluid dynamic pressure bearing device can be reduced.

The sealing member may be fixed to an inner periphery of the housing under a clearance fit state, or may be fixed to the inner periphery of the housing under the interference fit state. In a case where the sealing member is fixed to the inner periphery of the housing under the interference fit state, the sealing member and the housing are fixed to each other substantially by a fixing method such as bonding or welding (for example, laser welding). The method is used to prevent the relative movement of the sealing member with respect to the housing as much as possible. Herein, the terms "clearance fit" and "interference fit" denote "clearance fit" and "interference fit" defined in JIS B0401.

Advantageous Effects of Invention

As described above, according to the present invention, for the assembly of the fluid dynamic bearing device in which the thrust bearing clearances are each formed on the one end surface and the another end surface of the bearing member fixed to the outer periphery of the shaft member, the clearance widths of the two thrust bearing clearances can be set easily with high accuracy without varying the relative axial positions of the shaft member and the bearing member. Therefore, the fluid dynamic bearing device that is compact in the axial direction and excellent in supportability in both of the thrust directions can be obtained.

DESCRIPTION OF EMBODIMENTS

Now, description is made of embodiments of the present invention with reference to the drawings.

Figure 1:
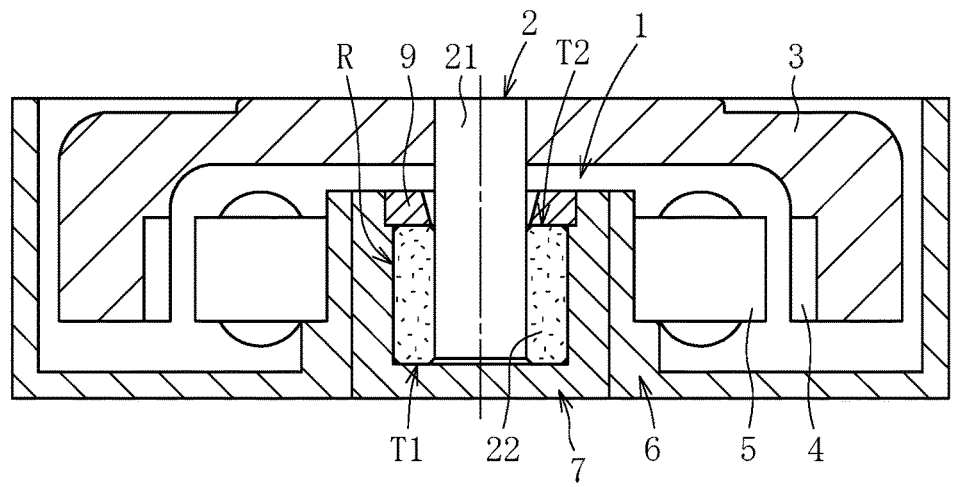
FIG. 1 is a sectional view for conceptually illustrating one configuration example of a fan motor.

In FIG. 1, there is conceptually illustrated a configuration example of a fan motor having built therein a fluid dynamic bearing device 1 that can be obtained by applying a manufacturing method according to the present invention. The fan motor illustrated in FIG. 1 comprises the fluid dynamic bearing device 1, a motor base 6 constructing a stationary side of the motor, stator coils 5 fixed to the motor base 6, a rotor 3 constructing a rotary side of the motor and comprising fans (blades), and a rotor magnet 4 being fixed to the rotor 3 and facing the stator coils 5 across a radial gap. A housing 7 of the fluid dynamic bearing device 1 is fixed to an inner periphery of the motor base 6, and the rotor 3 is fixed to a shaft member 21 of the fluid dynamic bearing device 1. In the fan motor having the structure described above, when the stator coils 5 are energized, an electromagnetic force is generated between the stator coils 5 and the rotor magnet 4 so as to cause the rotor magnet 4 to rotate. In conjunction therewith, a rotary body 2 comprising the shaft member 21, the rotor 3 fixed to the shaft member 21, and the like is caused to rotate.

When the rotary body 2 is caused to rotate, air is blown upward or downward in FIG. 1 depending on a form of the blades formed on the rotor 3. Thus, during rotation of the rotary body 2, a reactive force of this blowing action is applied as an upward or downward thrust force in FIG. 1 to the rotary body 2. In a region between the stator coils 5 and the rotor magnet 4, a magnetic force (repulsive force) is applied in a direction in which the thrust force is counterbalanced. A thrust load, which is generated by a difference in magnitude between the thrust force and the magnetic force, is supported by thrust bearing portions T1 and T2 of the fluid dynamic bearing device 1. The magnetic force in the direction in which the thrust force is counterbalanced can be generated, for example, by arranging the stator coils 5 and the rotor magnet 4 with a shift in the axial direction. Further, during the rotation of the rotary body 2, a radial load applied to the fluid dynamic bearing device 1 is supported by a radial bearing portion R of the fluid dynamic bearing device 1.

Figure 2:
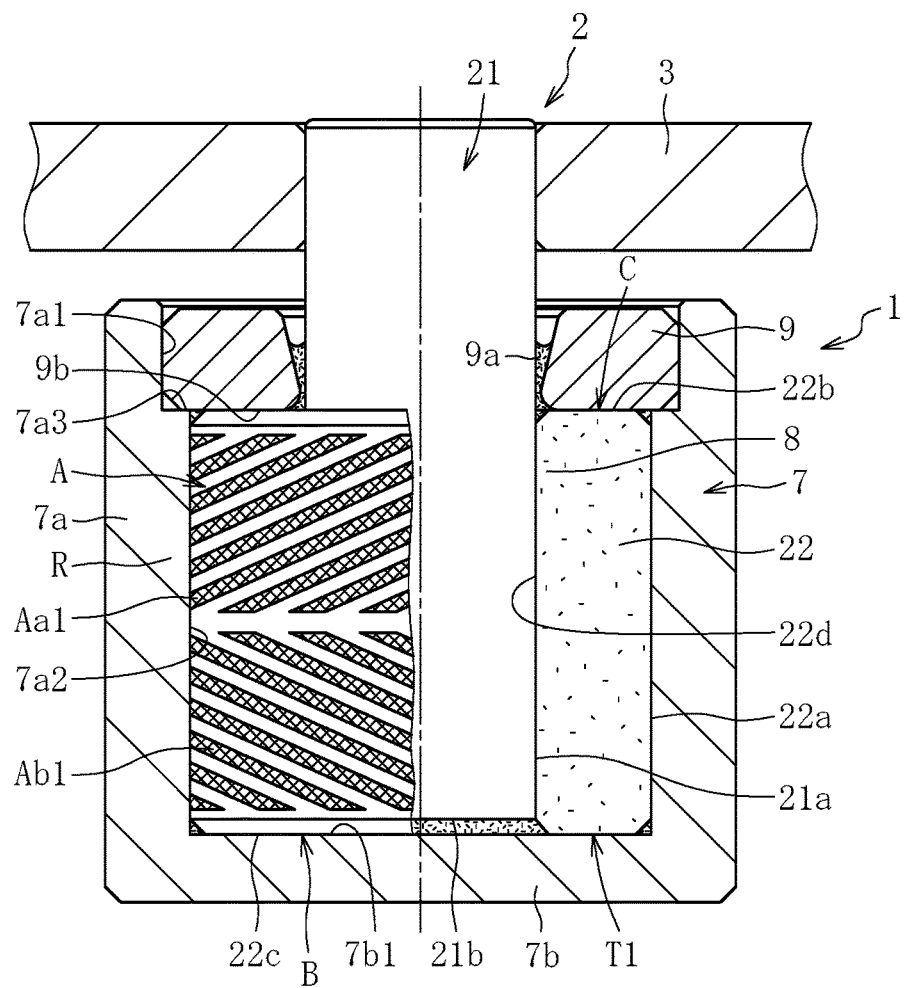
FIG. 2 is an enlarged sectional view of a fluid dynamic bearing device illustrated in FIG. 1.

In FIG. 2, the fluid dynamic bearing device 1 is illustrated in an enlarged manner. The fluid dynamic bearing device 1 comprises the shaft member 21 constructing the rotating side (rotary body 2) and a bearing member 22 fixed to an outer periphery thereof, a housing 7 on a stationary side, in which the bearing member 22 and the shaft member 21 are accommodated on an inner periphery, and a sealing member 9 fixed to the housing 7 as main components. An internal space of the housing 7 is filled with lubricating oil (indicated by the dense dots). In the following description, a side on which the sealing member 9 is arranged is defined as an upper side, and a side opposite thereto in an axial direction is defined as a lower side for convenience. However, a mode of use of the fluid dynamic bearing device 1 is not limited thereto.

The housing 7 has a cylinder portion 7a integrally having a cylindrical shape and a bottom portion 7b, which is configured to close a lower end opening of the cylinder portion 7a, to form a cylindrical shape with a closed end. An inner peripheral surface of the cylinder portion 7a is partitioned into a large-diameter inner peripheral surface 7a1 and a small-diameter inner peripheral surface 7a2 through a step portion (level-difference surface) 7a3. The sealing member 9 is fixed to the large-diameter inner peripheral surface 7a1. The small-diameter inner peripheral surface 7a2 has a cylindrical region that forms a radial bearing clearance of the radial bearing portion R in cooperation with an outer peripheral surface 22a of the bearing member 22 fixed to the outer periphery of the shaft member 21. The cylindrical region is formed as a smooth surface without irregularity. Further, an inner bottom surface 7b1 of the bottom portion 7b has an annular region that forms a thrust bearing clearance (hereinafter also referred to as "first thrust bearing clearance") of the first thrust bearing portion T1 in cooperation with a lower end surface 22c of the bearing member 22. The annular region is formed as a smooth surface without irregularity.

The sealing member 9 is made of a metal or a resin into an annular shape, and is fixed (press-fitted and fixed) to the large-diameter inner peripheral surface 7a1 under an interference fit state. Although a lower end surface 9b of the sealing member 9 is illustrated in FIG. 2 as being held in abutment against a level-difference surface 7a3 of the housing 7, the lower end surface 9b of the sealing member 9 is not necessarily held in abutment against the level-difference surface 7a3 of the housing 7. Specifically, the lower end surface 9b of the sealing member 9 and the level-difference surface 7a3 of the housing 7 are held in abutment against each other in some cases or are not held in abutment against each other in some cases. Whether both the surfaces 9b and 7a3 are in the abutment state or the non-abutment state is determined by an axial dimension between the inner bottom surface 7b1 of the housing 7 and the level-difference surface 7a3, an axial dimension of the bearing member 22, and clearance widths of thrust bearing clearances formed on both axial sides of the bearing member 22. Further, a relative axial position of the sealing member 9 with respect to the housing 7 is determined in an assembly step for the fluid dynamic bearing device 1, which is described later.

An inner peripheral surface 9a of the sealing member 9 is formed in a tapered surface shape having a diameter gradually decreased in a downward direction and forms a sealed space S having a radial dimension gradually decreased in the downward direction in cooperation with an outer peripheral surface 21a of the shaft member 21, which is opposed thereto. The sealed space S has a buffering function of absorbing a volume change amount generated along with a temperature change of the lubricating oil that fills the internal space of the housing 7, and constantly maintains an oil level of the lubricating oil within an axial range of the sealed space S while the temperature change falls within a supposed range. Although not shown, an oil-repellent film may be formed on the outer peripheral surface 21a of the shaft member 21 and an upper end surface of the sealing member 9, which are held in contact with an atmosphere, so as to prevent leakage of the lubricating of through the sealed space S.

The shaft member 21 is made of a metal material such as stainless steel, and the outer peripheral surface 21a thereof is formed into a smooth cylindrical surface. The rotor 3 having the blades is fixed to an upper end of the shaft member 21.

The bearing member 22 is constructed of a porous member, in this case, a porous member made of a sintered metal mainly based on copper or iron, and is formed into a cylindrical shape. The bearing member 22 is fixed to the outer peripheral surface 21a of the shaft member 21 so that the lower end surface 22c thereof is positioned on an axially outer side (lower side) of a lower end surface 21b of the shaft member 21, and is fixed only by press-fit in this embodiment. The bearing member 22 may be constructed of a porous member other than the sintered metal, such as a porous resin, or may be formed of a soft metal such as brass.

Although not shown, one or a plurality of communication paths configured to bring both an end surface 22b and the end surface 22c of the bearing member 22 into communication with each other may be formed on the rotary body 2. The communication path can be formed by, for example, forming an axial groove on any one or both of an inner peripheral surface 22d of the bearing member 22 and the outer peripheral surface 21a of the shaft member 21, which are opposed to each other.

On the outer peripheral surface 22a of the bearing member 22, there is formed a cylindrical radial bearing surface A for forming the radial bearing gap in the radial bearing portion R between the cylindrical radial bearing surface A and the small-diameter inner peripheral surface 7a2 of the housing 7 opposed thereto. On the radial bearing surface A, there is formed a dynamic pressure generating portion (radial dynamic pressure generating portion) for causing a dynamic pressure generating action in the lubricating oil present in the radial bearing gap. The radial dynamic pressure generating portion of the illustrated example is formed by arraying a plurality of dynamic pressure generating grooves Aa1 and Ab1, which are each inclined in opposite directions and are separated from each other in the axial direction, in a herringbone pattern.

Figure 3:
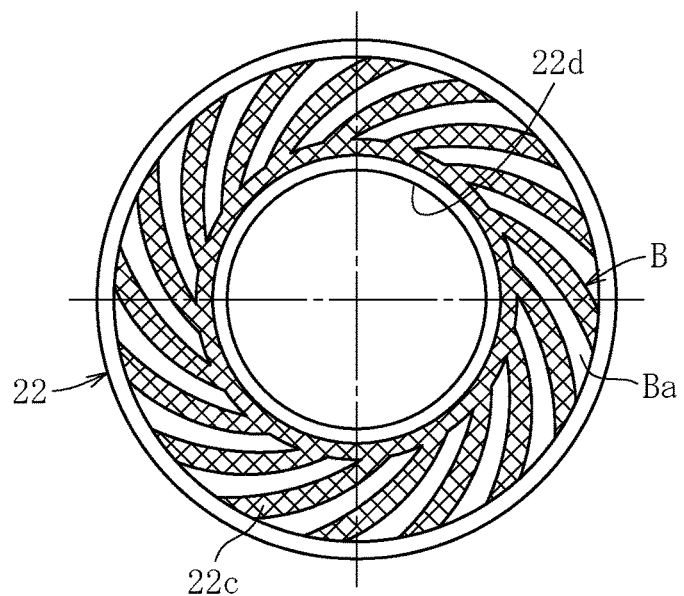
FIG. 3 is a plan view for illustrating a lower end surface of a bearing member illustrated in FIG. 2.

As also illustrated in FIG. 3, a first bearing surface B having an annular shape that forms a first thrust bearing clearance is formed on the lower end surface 22c of the bearing member 22 in cooperation with the inner bottom surface (upper end surface of the bottom portion 7b) 7b1 of the housing 7, which is opposed thereto. On the first thrust bearing surface B, a thrust dynamic pressure generating portion configured to generate a dynamic pressure generating action in the lubricating oil present in the first thrust bearing clearance along with the rotation of the rotary body 2 is formed. The thrust dynamic pressure generating portion of the illustrated example is formed by forming a plurality of dynamic pressure generating grooves Ba, each having a spiral shape, at predetermined intervals in a circumferential direction.

On the upper end surface 22b of the bearing member 22, a second thrust bearing surface C having an annular shape that forms a thrust bearing clearance (hereinafter also referred to as "second thrust bearing clearance") of the second thrust bearing portion T2 is formed in cooperation with the lower end surface 9b of the sealing member 9, which is opposed thereto. On the second thrust bearing surface C, a thrust dynamic pressure generating portion configured to generate the dynamic pressure generating action in the lubricating oil present in the second thrust bearing clearance along with rotation of the rotary body 2 is formed. Although not shown, the thrust dynamic pressure generating portion is formed by forming a plurality of dynamic pressure generating grooves, each having a spiral shape, at predetermined intervals in the circumferential direction, similarly to, for example, the thrust dynamic pressure generating portion formed on the lower end surface 22c of the bearing member 22.

In the fluid dynamic bearing device 1 having the structure described above, along with the rotation of the rotary body 2 comprising the shaft member 21 and the bearing member 22, the radial bearing gap is formed between the radial bearing surface A formed on the outer peripheral surface 22a of the bearing member 22 and the small-diameter inner peripheral surface 7a2 of the housing 7 opposed thereto. Then, along with the rotation of the rotary body 2, a pressure of an oil film formed in the radial bearing gap is increased by the dynamic pressure generating action in the radial dynamic pressure generating portion, and the radial bearing portion R in which the rotary body 2 is supported in a non-contact manner in the radial direction is formed. Simultaneously therewith, the first thrust bearing clearance is formed between the first thrust bearing surface B formed on the lower end surface 22c of the bearing member 22 and the inner bottom surface 7b1 of the housing 7, which is opposed thereto, whereas the second thrust bearing clearance is formed between the second thrust bearing surface C formed on the upper end surface 22b of the bearing member 22 and the lower end surface 9b of the sealing member 9, which is opposed thereto. Then, along with the rotation of the rotary body 2, oil film pressures in the first thrust bearing clearance and the second thrust bearing clearance are each increased by the dynamic pressure generating actions in the thrust dynamic pressure generating portions, thereby forming the first thrust bearing portion T1 and the second thrust bearing portion T2 configured to support the rotary body 2 in one thrust direction and another thrust direction in a non-contact manner.

By forming the communication path (not shown) that brings both the end surfaces 22b and 22c of the bearing member 22 into communication with each other, the lubricating oil that is present in the internal space of the housing 7 can be circulated so as to pass through a path from the first thrust bearing clearance through the communication path, the second thrust bearing clearance to the radial bearing clearance during the rotation of the rotary body 2. In this manner, a pressure balance in the internal space of the housing 7 can be maintained. At the same time, oil film shortage in each of the bearing clearances can be prevented. Thus, stabilization of bearing performance can be achieved.

The fluid dynamic bearing device 1 described above is obtained through an assembly step of assembling the members while setting the clearance widths of the first thrust bearing clearance and the second thrust bearing clearance and then by filling the internal space of the housing 7 with the lubricating oil. A procedure of manufacturing the fluid dynamic bearing device 1 is now described in detail mainly for an assembly step (step of setting the widths of the first thrust bearing clearance and the second thrust bearing clearance) illustrated in FIG. 4 to FIG. 6.

Figure 4:
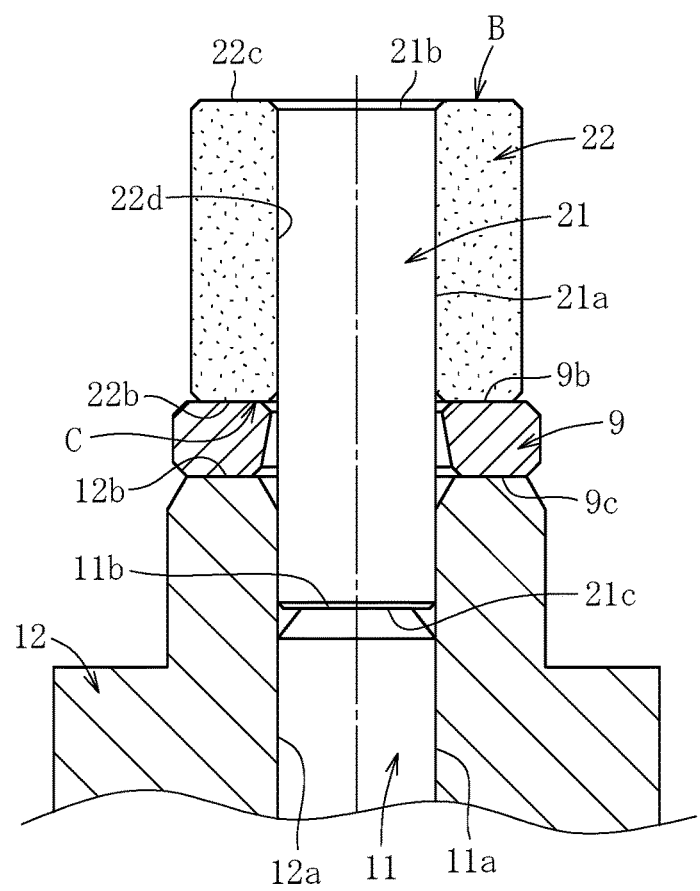
FIG. 4 is a schematic sectional view for illustrating a reference setting stage in an assembly step for the fluid dynamic bearing device illustrated in FIG. 2.
Figure 5:
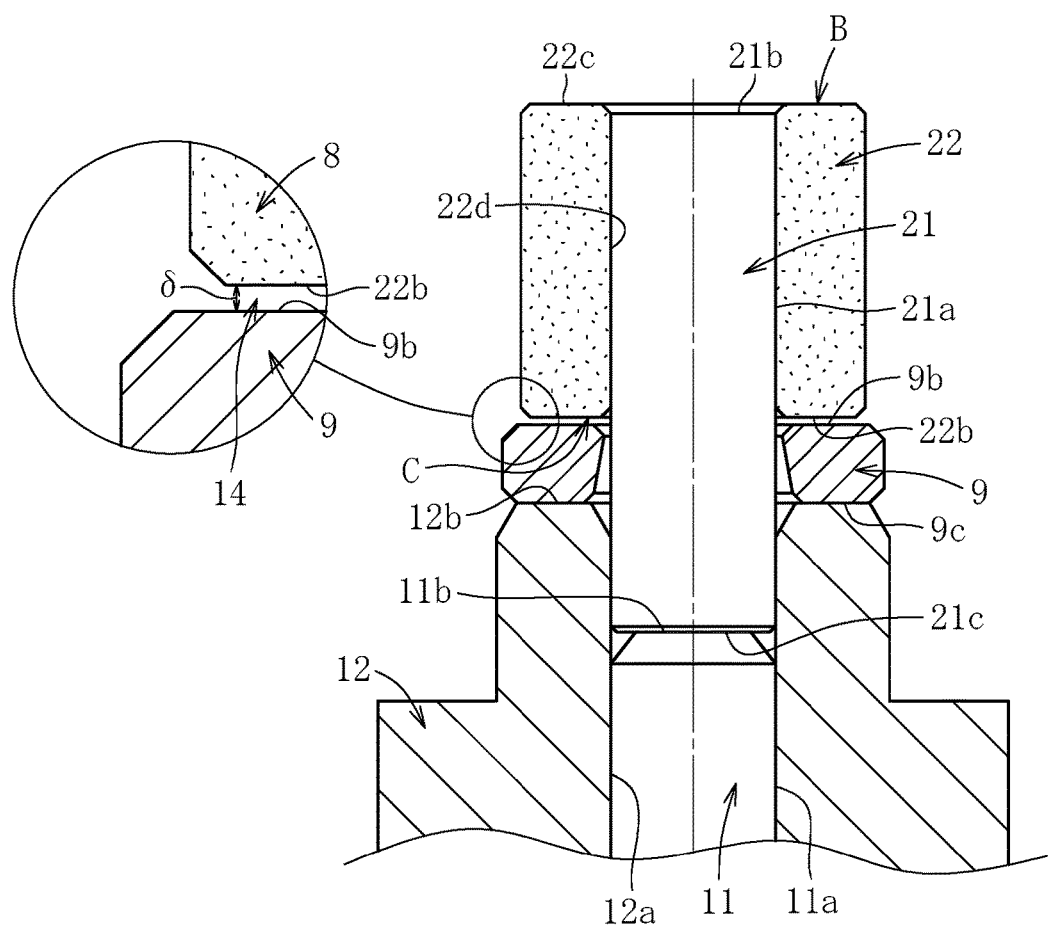
FIG. 5 is a schematic sectional view for illustrating an axial clearance forming stage in the assembly step for the fluid dynamic bearing device illustrated in FIG. 2.
Figure 6:
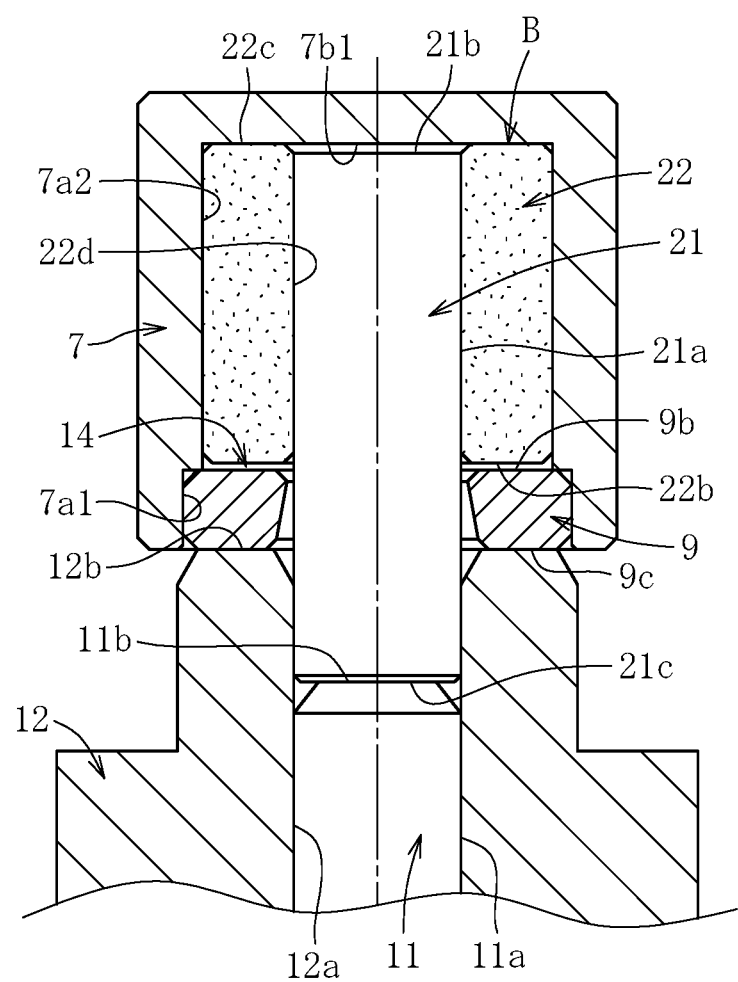
FIG. 6 is a schematic sectional view for illustrating a sealing member fixing stage in the assembly step for the fluid dynamic bearing device illustrated in FIG. 2.

The assembly step for the fluid dynamic bearing device 1 mainly involves (a) a reference setting stage, (b) an axial clearance forming stage, and (c) a sealing member fixing stage, which are carried out by using an assembly apparatus illustrated in FIG. 4 to FIG. 6. The assembly apparatus includes a first supporting member 11, which has a shaft-like shape and is configured to support the shaft member 21 from a lower side, a second supporting member 12, which has a cylindrical shape, is arranged on an outer diameter side of the first supporting member 11, and is configured to support the sealing member 9 from a lower side, and a holding member (not shown) configured to hold the housing 7. The first supporting member 11, the second supporting member 12, and the holding member are arranged coaxially. The first supporting member 11 and the second supporting member 12 are set relatively movable in the axial direction (vertical direction). In order to achieve the relative movement, an outer peripheral surface 11a of the first supporting member 11 is opposed to an inner peripheral surface 12a of the second supporting member 12 through a slight radial clearance (not shown) therebetween. The holding member is relatively movable in the axial direction with respect to both the supporting members 11 and 12.

(a) Reference Setting Stage

In this state, as illustrated in FIG. 4, a reference position is set by bringing the upper end surface 22b (second thrust bearing surface C) of the bearing member 22 fixed to the outer periphery of the shaft member 21 and the lower end surface 9b of the sealing member 9 into abutment against each other. In the illustrated example, the shaft member 21 and the sealing member 9 are placed in the assembly apparatus so that an upper end surface 21c of the shaft member 21 having the outer periphery to which the bearing member 22 is fixed in advance is brought into contact with an upper end surface 11b of the first supporting member 11, and an upper end surface 9c of the sealing member 9 is brought into contact with an upper end surface 12b of the second supporting member 12. As a result, the second thrust bearing surface C of the bearing member 22 and the lower end surface 9b of the sealing member 9 are brought into contact with each other. The bearing member 22 is fixed to the outer periphery of the shaft member 21 only by press-fit.

(b) Axial Clearance Forming Stage

Next, as illustrated in FIG. 5, the first supporting member 11 and the second supporting member 12 are moved relatively, that is, the first supporting member 11 is moved upward in this case, in the axial direction, thereby forming an axial clearance 14 having a clearance width δ between the second thrust bearing surface C of the bearing member 22 and the lower end surface 9b of the sealing member 9. In this case, when a clearance width of the first thrust bearing clearance to be formed (set) is δ1 and a clearance width of the second thrust bearing clearance to be formed (set) is δ2, the clearance width δ of the axial clearance 14 is set to a value that satisfies a relational expression: δ=δ1+δ2, specifically, a value equal to a total amount of the clearance widths of both the thrust bearing clearances. Although the clearance width δ of the axial clearance 14 is from about a dozen of μm to about several tens of μm in practice, the clearance width is illustrated in an exaggerated manner in FIG. 5 (and FIG. 6) for ease of understanding.

(C) Sealing Member Fixing Stage

Next, as illustrated in FIG. 6, both the supporting members 11 and 12 and the holding member (not shown) are moved relatively so as to be brought closer to each other until the lower end surface 22c of the bearing member 22 (first thrust bearing surface C) comes into contact with the inner bottom surface 7b1 of the housing 7 while the axial clearance 14 having the clearance width δ is maintained. Then, the sealing member 9 is fitted into and fixed to the large-diameter inner peripheral surface 7a1 of the housing 7 under the interference fit state. As a result, it is possible to obtain an assembly in which the shaft member 21 having the outer periphery to which the bearing member 22 is fixed is accommodated on the inner periphery of the housing 7 so as to be relatively rotatable, and in which the sealing member 9 is fixed at a predetermined axial position on the housing 7, that is, a position that enables the clearance widths of the first thrust bearing clearance and the second thrust bearing clearance to be set to predetermined values.

After both the supporting members 11 and 12 and the holding member are moved relatively so as to be separated from each other, the above-mentioned assembly is removed from the assembly apparatus. Then, the internal space of the housing 7 including internal pores of the bearing member 22 made of the sintered metal is filled with the lubricating oil, thereby obtaining the fluid dynamic bearing device 1 illustrated in FIG. 2.

As described above, with the manufacturing method for the fluid dynamic bearing device 1 according to the present invention, the widths of both the thrust bearing clearances are set on the outer side of the housing 7. Therefore, the members (end surfaces) involved in the formation of the thrust bearing clearances are not required to be brought into firm abutment against each other in the reference setting stage that is first executed in the assembly step for the fluid dynamic bearing device 1. Therefore, there can be avoided circumstances in which accuracy of shapes of the dynamic pressure generating portions each formed on the lower end surface 22c (first thrust bearing surface B) and the upper end surface 22b (second thrust bearing surface C) of the bearing member 22 is lowered. Further, even in the axial clearance forming stage after the reference setting, in which the clearance widths of the thrust bearing clearances are substantially determined, the shaft member 21 and the housing 7 are not required to be moved relatively in the axial direction under a state in which the bearing member 22 is engaged with the sealing member 9. Thus, even in this embodiment in which the sealing member 9 is fixed to the housing 7, that is, the sealing member 9 is press-fitted into and fixed to the housing 7, under the interference fit state, while the bearing member 22 is fixed over the shaft member 21 only by the press-fit, a possibility that the relative axial positions of the shaft member 21 and the bearing member 22 may be varied can be eliminated at the time of setting the widths of both of the thrust bearing clearances. Then, when the bearing member 22 is fixed over the shaft member 21 only by the press-fit, the assembly of the fluid dynamic bearing device 1 can be easily and quickly performed.

Further, positioning of the sealing member 9 press-fitted into and fixed to the inner periphery of the housing 7 in the axial direction is completed only by press-fitting the sealing member 9 into the inner periphery of the housing 7, that is, by moving the sealing member 9 toward the bottom portion 7b of the housing 7, and hence the sealing member 9 press-fitted into the inner periphery of the housing 7 is not required to be moved again toward an opening side of the housing 7. Therefore, generation of abrasion power at a fitted portion between the housing 7 and the sealing member 9 can be prevented as much as possible. In addition, decrease in fastening strength of the sealing member 9 with respect to the housing 7 can be prevented as much as possible.

As described above, according to the present invention, the clearance widths of the thrust bearing clearances formed each on the lower end surface 22c and the upper end surface 22b of the bearing member 22 fixed to the outer periphery of the shaft member 21 can be set easily with high accuracy. As a result, the fluid dynamic bearing device 1 which is compact in the axial direction and excellent in the bearing performance in the thrust directions can be provided.

Although the fluid dynamic bearing device 1 and the manufacturing method therefor according to one embodiment of the present invention have been described above, the embodiment of the present invention is not limited thereto.

For example, the sealing member 9 can also be fixed to the inner periphery of the housing 7 by using bonding with an adhesive at the fitted portion with the housing 7 or welding and joining the fitted portion with the housing 7 in conjunction therewith. In this manner, the fastening strength of the sealing member 9 to the housing 7 can be further increased, and hence reliability of the fluid dynamic bearing device 1 can be enhanced.

When the sealing member 9 is press-fitted into and fixed to the inner periphery of the housing in conjunction with the bonding, the adhesive may be applied to any one or both of an outer peripheral surface of the sealing member 9 and the large-diameter inner peripheral surface 7a1 of the housing 7 before the sealing member fixing stage illustrated in FIG. 6 is carried out or may be used to fill the fitted portion between the two after the sealing member 9 is fitted into the inner periphery of the housing 7. When the former procedure is adopted, the adhesive functions as a lubricant. Therefore, there is provided an advantage in that the sealing member 9 can be smoothly press-fitted into the inner periphery of the housing 7. When the latter procedure is adopted, there is provided an advantage in that the adhesive applied in advance can be prevented from being pushed out to a front side in a direction in which the sealing member 9 is press-fitted as much as possible. As the adhesive, for example, an anaerobic adhesive, a thermosetting adhesive, and the like can be used.

Further, the sealing member 9 may be fixed to the inner periphery of the housing 7 not under the interference fit state but under a clearance fit state. In this case, however, the sealing member 9 is substantially fixed to the housing 7 by a fixing method such as bonding or welding. This method is used to prevent the relative movement of the sealing member 9 with respect to the housing 7 as much as possible during delivery or an operation of the fluid dynamic bearing device 1, or the like.

Further, when there is no particular problem in terms of cost, the bearing member 22 may be fixed to the shaft member 21 by a method such as bonding or welding in place of the press-fit or in conjunction with the press-fit.

Further, although the present invention has been applied to the assembly of the fluid dynamic bearing device 1 in which the radial bearing portion R configured to support the rotary body 2 in the radial direction is provided at only one position in the axial direction in the description given above, the present invention can also be applied to the assembly of the fluid dynamic bearing device 1 in which the radial bearing portions R (radial bearing surfaces A) are provided at two or more positions in the axial direction so as to be separated from each other.

Further, although the present invention has been applied to the assembly of the fluid dynamic bearing device 1 in which the radial dynamic pressure generating portion is formed on the outer peripheral surface 22*a* (radial bearing surface A) of the bearing member 22, and in which the thrust dynamic pressure generating portions are formed on the lower end surface 22*c* (first thrust bearing surface B) and the upper end surface 22*b* (second thrust bearing surface C) of the bearing member 22 in the description given above, the present invention can also be preferably applied to the assembly of the fluid dynamic bearing device 1 in which each of the dynamic pressure generating portions is formed on the opposed surface facing the bearing member 22 through the bearing clearance. Further, the present invention can be preferably applied to the assembly of the fluid dynamic bearing device 1 in which the radial bearing portion R is constructed of another known fluid dynamic bearing such as so-called multi-robe bearing, step bearing, and corrugated bearing or the fluid dynamic bearing device in which any one or both of the thrust bearing portions T1 and T2 are constructed of another known fluid dynamic bearing such as so-called step bearing or corrugated bearing.

Yet further, in the case described above, the present invention is applied to the assembly of the fluid dynamic bearing device 1 in which the rotor 3 comprising the blades is fixed to the shaft member 21. However, the present invention is preferably applicable also to an assembly of the fluid dynamic bearing device 1 in which a disk hub having a disk mounting surface or a polygonal mirror is fixed to the shaft member 21. In other words, the present invention is preferably applicable not only to the fluid dynamic bearing device 1 built in the fan motor as illustrated in FIG. 1 but also to an assembly of the fluid dynamic bearing device 1 built in other electrical-apparatus motors such as a spindle motor for disk drives, and a polygon scanner motor for laser beam printers (LBP).

Although the present invention has been applied to the assembly of the fluid dynamic bearing device 1 in which the shaft member 21 and the bearing member 22 fixed to the outer periphery thereof construct the rotating side and the housing 7 and the sealing member 9 construct the stationary side in the description given above, the present invention can also be applied to the assembly of the fluid dynamic bearing device 1 in which the shaft member 21 and the bearing member 22 construct the stationary side and the housing 7 and the sealing member 9 construct the rotating side.

REFERENCE SIGNS LIST

1 fluid dynamic bearing device
2 rotary body
7 housing
7*a* cylinder portion
7*b* bottom portion
7*b*1 inner bottom surface
9 sealing member
14 axial clearance
21 shaft member
22 bearing member
A radial bearing surface
B first thrust bearing surface
C second thrust bearing surface
S sealed space
R radial bearing portion
T1 first thrust bearing portion
T2 second thrust bearing portion
δ clearance width (clearance width in axial direction)

The invention claimed is:

1. A manufacturing method for a fluid dynamic bearing device, the fluid dynamic bearing device comprising a shaft member, a bearing member fixed to an outer periphery of the shaft member, a housing integrally having a cylinder portion and a bottom portion configured to close an opening at one end of the cylinder portion, the housing configured to accommodate the shaft member and the bearing member on an inner periphery of the housing so as to enable relative rotation thereof, a sealing member configured to seal an opening at another end of the housing, the bearing member comprising a radial bearing surface configured to form a radial bearing clearance on an outer peripheral surface of the bearing member in cooperation with an inner peripheral surface of the cylinder portion, a first thrust bearing surface, which is formed on one end surface, and is configured to form a first thrust bearing clearance in cooperation with the bottom portion, and a second thrust bearing surface, which is formed on another end surface, and is configured to form a second thrust bearing clearance in cooperation with the sealing member, for assembly of the fluid dynamic bearing device, the method comprising:

forming an axial clearance having a clearance width equal to a total amount of clearance widths of the first and second thrust bearing clearances between the second thrust bearing surface of the bearing member fixed to the outer periphery of the shaft member and the sealing member;

relatively moving the shaft member, the bearing member, and the sealing member with respect to the housing while the clearance width of the axial clearance is maintained after forming the axial clearance; and fixing the sealing member to the housing at a time when the first thrust bearing surface of the bearing member comes into contact with the bottom portion.

2. The manufacturing method for the fluid dynamic bearing device according to claim 1, wherein the bearing member is fixed to the outer periphery of the shaft member only by press-fit.

3. The manufacturing method for the fluid dynamic bearing device according to claim 1, wherein the sealing member is fixed to the inner periphery of the housing under an interference fit state.

4. The manufacturing method for the fluid dynamic bearing device according to claim 1, wherein the sealing member is fixed to the inner periphery of the housing under a clearance fit state.

* * * * *